Figure 1:
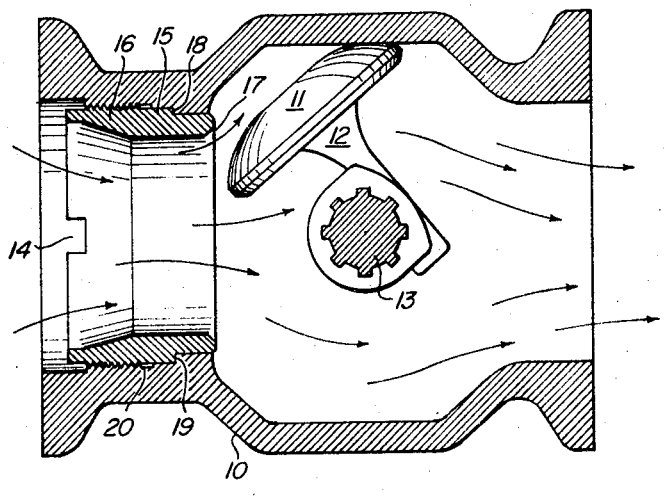

United States Patent [19]
Bates

[11] 3,749,358
[45] July 31, 1973

[54] VALVE HAVING ADJUSTABLE SEATING MEANS

[76] Inventor: Charles Bates, 4182 Crestview Ave., Provo, Utah

[22] Filed: Apr. 1, 1971

[21] Appl. No.: 130,573

[52] U.S. Cl. .................................. 251/298, 308/58
[51] Int. Cl. ............................................. F16k 1/16
[58] Field of Search .................... 251/298, 161, 163, 251/188, 305, 306, 308; 137/527.3, 527.4; 308/58

[56] References Cited
UNITED STATES PATENTS

| | | | |
|---|---|---|---|
| 208,733 | 10/1878 | Harrington | 308/58 UX |
| 1,276,613 | 8/1918 | Bergman | 308/58 X |
| 2,919,885 | 1/1960 | Daigle | 251/298 X |
| 1,668,839 | 5/1928 | Cureton | 308/58 X |
| 3,158,172 | 11/1964 | Giovannetti et al. | 251/161 X |
| 3,262,671 | 7/1966 | Muench | 251/163 |
| 3,272,223 | 9/1966 | Sass | 251/161 X |

Primary Examiner—Henry T. Klinksiek
Attorney—William S. Britt, C. Harvey Gold and David V. Trask

[57] ABSTRACT

A valve having a valve cavity containing a disk rotated concentrically about an axle having external adjustment means is the subject of this disclosure. The adjustment means adjusts the relative radial position of the axle to the valve body and consequently adjusts the position of the valve disk relative to the valve seat to obtain an efficient seal therebetween without requiring disassembling of the valve. The external radial adjustment means supporting said axle is secured to said valve body.

7 Claims, 3 Drawing Figures

PATENTED JUL 31 1973

3,749,358

SHEET 1 OF 2

INVENTOR.
CHARLES BATES

BY William S Britt

ATTORNEY

INVENTOR.
CHARLES BATES 3,749,358

VALVE HAVING ADJUSTABLE SEATING MEANS

BACKGROUND OF THE INVENTION

Ball valves and disk valves are quick-opening valves which offer little resistance to fluid flow. A seal between the ball or disk and the valve seat is efficient only when the seat has been precisely machined and aligned. Frequently, the seat must be shimmed to effect perfect alignment and seating. Shimming, however, is a trial and error procedure whereby the valve must be disassembled and reassembled until an acceptable seal is obtained between the disk and seat.

Adjustable sealing means for disk valves is described in U.S. Pat. No. 2,048,943, wherein a disk is suspended from an axle which is supported at each end by a rotatable bearing. The recess which houses the axle is located off-center on the rotatable bearing. Rotation of the bearing means causes the end of the axle to travel in a small circle less than the circumference of said bearing means. This type of adjustment means is very limited inasmuch as the axle-end can only occupy a position on the orbit described by the recessed opening during rotation of the bearing. This configuration, while acceptable for flap or check valves is unsatisfactory for ball valves or disk valves used for throttling. That is, the ball or disk assumes and retains any desired open position relative to the seat upon external rotation of the axle attached to said disk ball or disk.

DESCRIPTION OF INVENTION

A valve having an internal, eccentrically rotatable disk which is externally adjustable to effect perfect sealing against an orifice-like valve seat has now been invented. This improvement in eccentrically rotating disk valves comprises an axle or trunnion means passing transversely through said valve body, said disk being eccentrically attached to said axle or trunnion means, with the axle being supported on each end by bearing means wherein said bearing means is disposed in an externally adjustable bearing housing.

Figure 2:
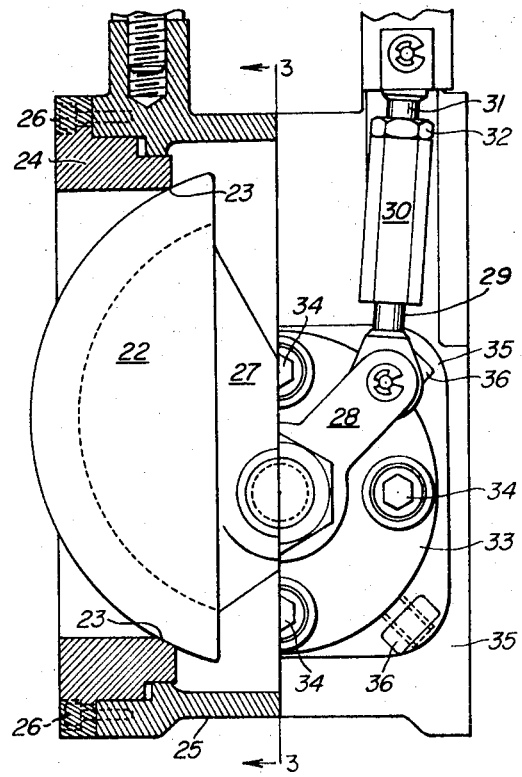
Figure 3:
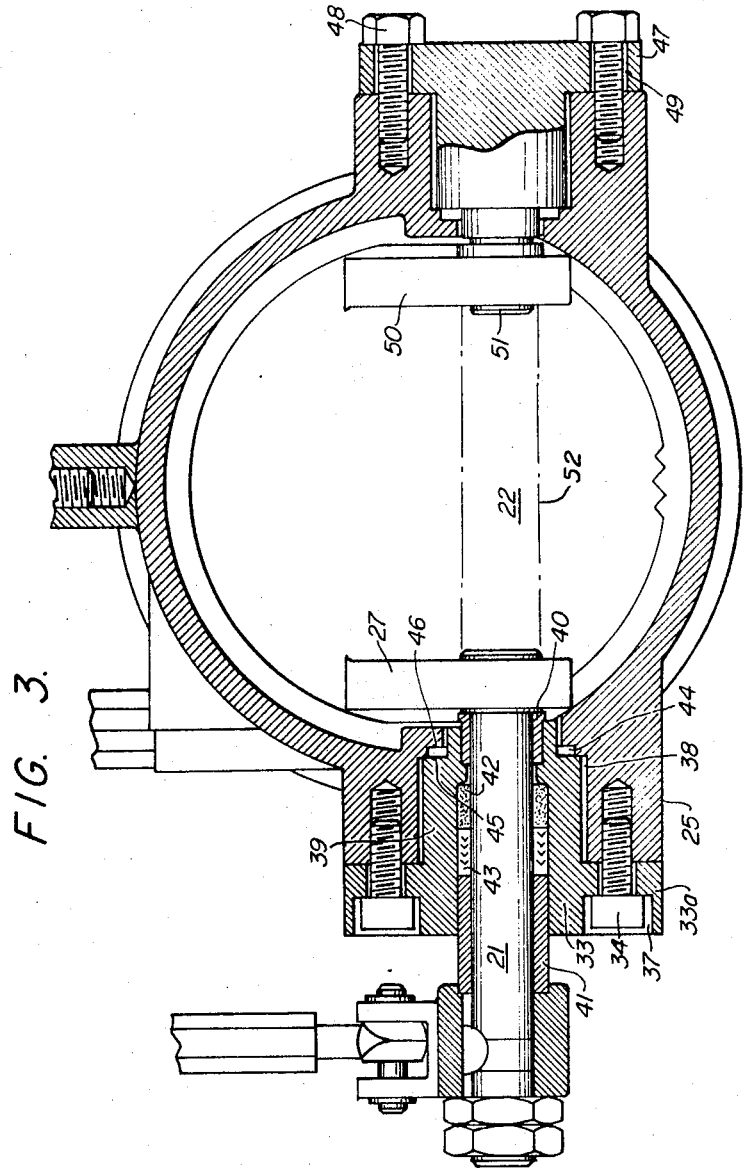

Description of the invention may be facilitated by reference to the attached drawings wherein FIG. 1 is a cross-sectional view of a typical eccentrically rotating disk valve in which the seat members may be adjusted by shim means to effect a good seal;

FIG. 2 is a partial sectional elevational view of the valve having external seating adjustment means; and FIG. 3 is a sectional elevational view along sectional lines 3—3 of FIG. 2.

The valve illustrated in FIG. 1 is a commercially available valve and is a part of the prior art over which the present invention is an improvement. The valve of FIG. 1 comprises a valve housing or body 10 in which is disposed a valve disk 11 which is attached by an offset member 12 in eccentric fashion to an axle 13 which passes transversely through the valve body. The axle 13 is generally not located in the center of the valve body, especially when the valve body configuration is symmetrical about a horizontal plane passing through the valve. The axle 13 is located below the vertical center of the valve shown in FIG. 1 because the eccentric rotation of the valve disk requires more open area above the axle than would be required if the disk rotated concentrically. The inlet 14 of the valve comprises a valve seat member 15 which is held in place by a threaded retaining ring 16. The seat member 15 is a cylindrical sleeve which projects into the valve body cavity a sufficient distance so that the disk member 11 makes contact with the machined seat portion of the member 17. The sleeve-like seat member is restrained in that position by a shoulder 18 in the upstream section of the valve which is contacted by an offset portion of the sleeve so that the sleeve projects only the desired distance into the valve body cavity. The sleeve-like seat member 15 is prevented from moving upstream or away from the disk by the cylindrical, threaded, hollow retaining ring 16 which is threaded into the inlet of the valve until it makes firm contact with the seat member 15. An O-ring seal 19 is located between the exterior periphery of the seat member and the internal opening of the inlet portion of the valve to prevent fluids from by-passing the seat when it is in sealing contact with the seat member 15. An additional O-ring seal 20 is located on the periphery of the retaining ring 16 for the purpose of preventing by-passing of fluids.

The seat member 15 may be shifting to change the position and orientation of the seat portion of the member by placing shims between the offset portion of the seat member 15 and a shoulder 18 of the valve body or by placing shims between the external periphery of the seat member and the valve body to raise or lower the seat member. A small amount of clearance is generally allowed between the external periphery of the seat member and the internal opening of the inlet of the valve to accommodate shimming of the seat member. It is readily apparent that shimming must be done while the valve is in an unassembled condition and that it is a trial and error technique to shim the seat member 15 and then place it in operation to determine if leakage around the disk occurs when the disk is in sealing contact with the seat member.

The novel valve of this invention is illustrated in FIG. 2, which is an elevational, partial-sectional, perspective view of the valve. By taking a vertical section through the axle 21 the hemispherical ball 22 is illustrated in a sealing position against the seat portion 23 of the seat member 24. The seat member 24 is attached to the valve body 25 by screws 26 although it could be threaded into the inlet opening of the valve. At least a pair of screws are utilized to secure the cylindrical sleeve-like seat member to the valve body and preferably about four screws 26 are used for this purpose. The seat member 24 does not require a separate sleeve-like retaining member to hold it in place. The construction shown in FIG. 2 permits the valve to have small length from inlet to outlet so that the valve does not consume much space and may be inserted in a line where limited space is available.

The ball 22 of the valve is secured by one or more offset web members 27 to one or more axles which are offset from the geometric center of the valve. The ball 22 moves eccentrically with respect to the valve body because the web member is offset so that the axle is located below the geometric center of the disk. The axle 21 is rotated by lever 28 which is actuated by arm 29 which is adjustable in length to compensate for the adjustment in position of the ball 22 with respect to the seat portion 23 of the seat member 24. The adjustment nut 30 is turned in one direction to shorten arm 29 and in the opposite direction to lengthen it. Arm 29 is connected through adjustment nut 30 to arm 31 which is connected to an actuating mechanism which is responsive to a control stimulus. Lock nut 32 prevents the accidential moving of adjustment nut 30. Arms 29 and 31 are threaded in the opposite direction so that turning of nut 30 in one direction will shorten the overall length of arms 29 and 31 while turning the nut 30 in the opposite direction increases the length.

Lever 28 is securely fastened to axle 21 by splines or a keyway or other means to lock lever 28 to axle 21 so that neither element will rotate without rotation of the other. An adjustable bearing housing 33 is secured to the valve body by bolts or studs 34 which are threaded into the valve body. The diameter of the holes in the bearing housing 33 through which bolt 34 passes is slightly greater than the diameter of the bolt or stud 34 so that it is possible to move bearing housing 33 very slightly in any radial direction with respect to bolt 34. Axle 21 passes through bearing housing 33 which generally contains a sleeve bearing for axle 21. Axle 21 fits snugly within bearing housing 33 so that no play or lag exists between axle 21 and the bearing housing 33. The bearing housing may be caused to move relative to the valve body and consequently cause the ball 22 to move relative to the seat member 24. The means for moving the bearing housing with respect to the valve body are adjustment means 35 which are illustrated in FIG. 2 as set screws passing through a threaded lug 36 projecting from the valve body. There are preferably four adjustment screws located equidistantly about the periphery of the bearing housing 33.

Although the valve illustrated in FIG. 2 shows a short lever attached to an actuating arm which is power-operated in response to control stimuli it is to be understood that the valve may also be manually operated wherein a lever comparable to lever 28 would extend a greater distance from the axle 21 and would be moved by hand to open and close the valve.

FIG. 3 is a sectional view along section lines 3—3 of FIG. 2 illustrating the manner in which bearing housing 33 is adjustably secured to the valve body 25. The flange portion 33a of bearing housing 33 is attached to the valve body by bolts 34 which pass through bolt holes in the flange 33a, said bolt holes 37 being of slightly larger diameter than the bolt passing therethrough so as to permit the flange to move laterally relative to bolt 34. The bearing housing 33 passes through an opening 38 in the valve body, said opening being slightly greater in diameter than the external diameter of the bearing housing projection 39 which passes through said opening. The bearing housing projection 39 may, therefore, move radially relative to the valve body.

In FIG. 3 the bearing housing 33 is shown with an inner sleeve bearing 40 which tightly fits within the bearing housing projection 39 and through which the axle 21 passes through in bearing relation. An external sleeve-like bearing 41 is also supported by the bearing housing 33 with packing means 42 and 43 being held tightly in place by the external bearing means 41. An O-ring type seal 44 is disposed in the opening 38 in the valve body which accommodates the bearing housing projection 39. The bearing housing projection 39 is preferably of a smaller diameter where it passes through the valve opening 38 into the valve body cavity so that a shoulder 45 is present for pressing the O-ring against an opposite shoulder 46 of the valve body to effect a tight, leak-proof seal. A similar bearing housing 47 is located on the opposite side of the valve body from bearing housing 33. Bearing housing 47 is preferably held in place by the same number of bolts as bearing housing 33, said bolts being preferably located directly opposite the bolts securing bearing housing 33 in place. The bolts 48 which hold bearing housing 47 in place passes through bolt holes 49 in the bearing housing 47, said bolt holes being slightly larger in diameter than the bolts so that the bearing housing 47 may move radially relative to the bolts. The bolts pass through the bearing housing 47 and are threaded into valve body 25 to secure the adjustable bearing housing 47 to said valve body. The bearing housing 47 is similar in construction to bearing housing 33, however, the axle connected to bearing housing 47 does not pass therethrough, but, in fact, may be an axle fixed to bearing housing 47 with bearing means located in offset member 50 so that the offset member securing the ball 22 to the axle 51 rotates about axle 51. Alternatively, axle 51 may be secured rigidly to offset member 50 and rotate within bearing housing 47. Although not shown on the drawing, bearing housing 47 is also in contact with lateral adjustment means, preferably of an identical nature to the lateral adjustment means in contact with bearing housing 33. A preferred adjustment means for contacting bearing housing 47 comprise set screws threaded through lugs projecting from the valve body and located equidistant about bearing housing 47.

The ball 22 may be adjusted relative to the seat member 24 by the tightening and loosening of screw members 35. For example, the tightening of a pair of screw members farthest from seat 24 and the loosening of the pair of screw members closest to seat 24 would move the ball towards seat 24. The tightening of the bottom screw members and the loosening of the upper two screw members would cause the ball 22 to move upward relative to the seat member 24. It is preferred that the identical but opposed screws on the opposite side of the valve be adjusted the same number of turns in the same direction so that the axles 51 and 21, which may, if desired be a single continuous axle 52, shown in phantom, rather than a split axle as illustrated in the drawings, are always aligned and are not in a binding situation with any of the bearings in which they are in contact with.

Although the instant invention has been described herein by reference to specific embodiments, it is not intended to be limited solely thereto, but to include all the variations and modifications falling within the scope of the appended claims.

The benefits of the instant invention, described hereinabove with specific reference to valves containing eccentrically rotating disks, are also realized in valves having concentrically rotating disks.

I claim:

1. In valves having a disk member which eccentrically rotates in a valve body to make sealing contact with an orifice-like seat, the improvement comprising:
   a. axle means supporting said disk by an offset member attached to said disk,
   b. bearing means supporting each end of said axle means,
   c. said bearing means disposed in an opening in said valve body substantially the same shape as the exterior of said bearing means but having slightly greater peripheral dimensions than the exterior surface of said bearing means, d. adjustment means comprising a pair of adjustable bearing housings in which opposite ends of said axle means are snugly supported, said bearing housings being adjustable radially to the longitudinal axes of said axle means wherein each adjustable bearing housing is secured to said valve body by at least two bolt means wherein the bolt holes in said adjustable bearing housing are slightly greater in diameter than said bolt means to accommodate slight radial movement of said adjustment bearing housings relative to said bolt means whereby the ends of said axle means are radially adjustable.

2. The valve of claim 1 wherein the disk face making sealing contact with a seat has a substantially spherical surface.

3. The valve of claim 1 wherein said axle means comprises a pair of opposed, aligned axles.

4. The valve of claim 3 wherein one of said axles is fixedly attached to a bearing housing adjustably secured to said valve body.

5. The valve of claim 3 wherein one of said axles passes through bearing means in a bearing housing secured to said valve body to a handle for rotating said axle means, said axle means transmitting rotational forces applied thereto to said valve disk.

6. The valve of claim 1 wherein four bolt means secure each adjustable bearing housing to opposite sides of said valve body.

7. The valve of claim 1 wherein the bearing means is disposed in a cylindrical opening in said valve body.

* * * * *